United States Patent [19]

Evenson et al.

[11] Patent Number: 5,222,356
[45] Date of Patent: Jun. 29, 1993

[54] MODULATING SURGE PREVENTION CONTROL FOR A VARIABLE GEOMETRY DIFFUSER

[75] Inventors: Kenneth W. Evenson, Scottsdale; Daniel J. Kuhn, Phoenix; Thomas Nesdill, Scottsdale; Robert B. Sumegi, Phoenix, all of Ariz.

[73] Assignee: Allied-Signal Inc., Morris Township, Morris County, N.J.

[21] Appl. No.: 806,565

[22] Filed: Dec. 12, 1991

[51] Int. Cl.$^5$ .............................. F02C 9/00; F02G 3/00
[52] U.S. Cl. .................................. 60/39.02; 60/39.29; 415/26
[58] Field of Search ........................... 60/39.02, 39.29; 415/26, 27, 28

[56] References Cited

U.S. PATENT DOCUMENTS

| | | | |
|---|---|---|---|
| 4,060,980 | 12/1977 | Elsaesser et al. | 60/39.29 |
| 4,164,034 | 8/1979 | Glennon et al. | 60/39.29 |
| 4,405,290 | 9/1983 | Rannenberg | 415/27 |
| 4,428,194 | 1/1984 | Stokes et al. | 415/27 |
| 4,460,310 | 7/1984 | Plunkett | 415/26 |
| 4,503,684 | 3/1985 | Mount et al. | 62/115 |
| 4,586,870 | 5/1986 | Hohlweg et al. | 415/27 |
| 4,603,546 | 8/1986 | Collins | 60/39.29 |
| 4,936,741 | 6/1990 | Blotenberg | 415/27 |
| 5,012,637 | 5/1991 | Dubin et al. | 60/39.02 |
| 5,042,245 | 8/1991 | Zickwolf, Jr. | 60/39.29 |
| 5,051,918 | 9/1991 | Parsons | 364/494 |

Primary Examiner—Richard A. Bertsch
Assistant Examiner—Howard R. Richman
Attorney, Agent, or Firm—Jerry J. Holden; Robert A. Walsh

[57] ABSTRACT

A modulating surge prevention control and method for a gas turbine engine having a variable geometry diffuser is provided. The control calculates a maximum permissible compressor discharge pressure from a predetermined algorithim that is representative of the compressor discharge pressure when the compressor is operating at its minimum permissible surge margin with the diffuser in its maximum open position. The control also receives a signal from a sensor measuring the actual compressor discharge pressure. A error signal is formed by taking the difference between the measured pressure signal and the calculated signal. The control then continously adjusts the area of the diffuser so as to maintain the actual compressor discharge pressure at or below the calculated pressure. The calculated pressure is also corrected for variations in ambient temperature and altitude.

17 Claims, 3 Drawing Sheets

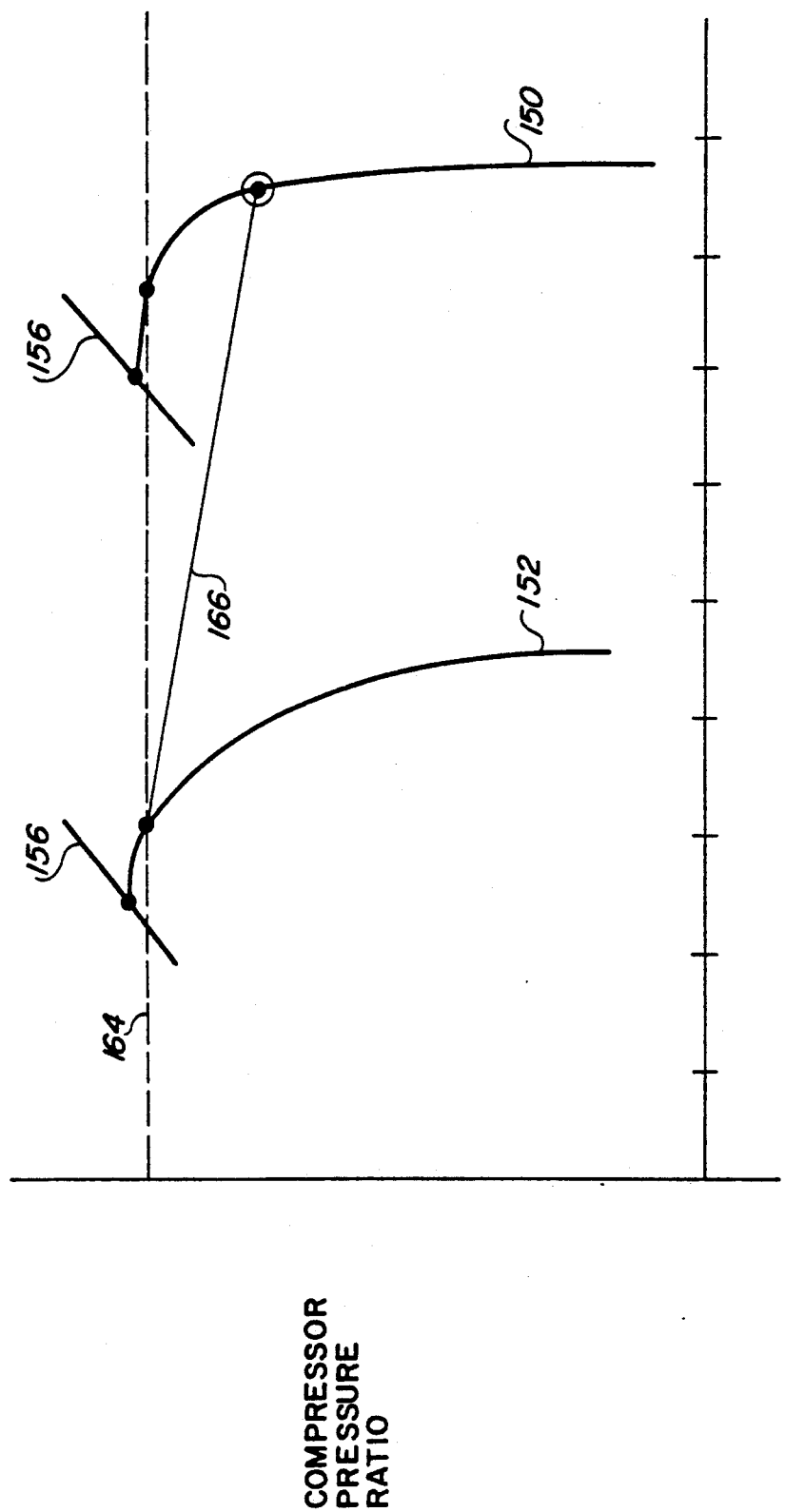

MODULATING SURGE PREVENTION CONTROL FOR A VARIABLE GEOMETRY DIFFUSER

CROSS-REFERENCE TO RELATED APPLICATION

This application, is related to copending U.S. patent application Ser. No. 07/805,661, which was filed concurrently. Both applications name the same inventors and are assigned to the same assignee.

TECHNICAL FIELD

This invention relates generally to controls and methods for gas turbine engines, and in particular to a control and method that modulates the area of a variable geometry diffuser to assure surge free operation as the engine transitions from one operating condition to another.

BACKGROUND OF THE INVENTION

In addition to their traditional propulsion functions, gas turbine engines are used as auxiliary power units aboard many types of aircraft to supply pneumatic power and/or shaft horsepower. A gas turbine auxiliary power unit includes in flow series arrangement a compressor, a bleed port, a combustor, and a turbine driving the compressor. A gearbox is drivingly coupled to the turbine and has a variety of aircraft accessories mounted thereto. Because the bleed port is disposed between the compressor and the combustor, these engines are referred to as integral bleed engines. When required, compressed air is bled through the bleed port and delivered to the aircraft where it is used in the environmental control system or for main engine starting. A load control valve is disposed in the bleed port to control the amount of bleed air. In an alternative configuration, a second compressor is operably coupled to the turbine and provides any required bleed flow. This type of configuration in referred to as a load compressor engine.

Regardless of the configuration, gas turbine auxiliary power units generally have two primary modes of operation. The first mode is maximum bleed flow in which the load control valve fully opens the bleed port and the maximum amount of compressed air is delivered to the aircraft. The second mode is maximum horsepower in which the control valve closes the bleed port and the horsepower generated by the engine is used to drive the accessories. As the engine transitions from the first mode to the second mode, the bleed port is closing which causes the pressure downstream of the compressor to rise. Should this pressure rise above the pumping capacity of the compressor, a surge will occur. During a surge, the direction of air flow in the compressor, reverses. This reversal of flow direction can be violent causing loud bangs and structural damage.

A conventional technique for preventing surge in these circumstances is to provide a surge valve within the bleed port. The surge valve is smaller than the load control valve and opens as the load control valve closes, thus limiting the rise of pressure downstream of the compressor. Unfortunately, the air bled through surge valve is dumped overboard. This dumped air is lost energy which must be compensated for by increasing the fuel flow to the combustor.

In order to eliminate the surge control valve and its associated losses, it has been proposed to employ a variable geometry diffuser within the compressor. It is well known in the art that variable geometry diffusers can improve an engine's power range and efficiency. With a variable geometry diffuser the engine can operate in the first mode with the diffuser in its maximum open setting and in the second mode with the diffuser in its minimum setting. However, even with a variable geometry diffuser the compressor can still be driven into a surge condition if the diffuser setting is not carefully adjusted as the engine transitions from the first mode to the second mode.

Accordingly, there is a need for a control and method that prevents compressor surge by adjusting the area of a variable geometry diffuser as the engine transitions from one operating condition to another.

Some aircraft manufactures desire to provide a signal to the auxiliary power unit when a change in the unit's operating conditions is required. For such aircraft a simple on/off surge prevention control can be provided that opens and closes the diffuser area in response to the aircraft signal. Other manufacturers desire not to provide such signals. For these applications the surge prevention control must be self contained and able to modulate the diffuser area in response to a variety of measurements from sensors mounted in the gas turbine engine.

SUMMARY OF THE INVENTION

The object of the present invention is to provide a control and method that responds to sensors mounted in the engine and modulates the area of the variable geometry diffuser to maintain sufficient surge margin.

The subject invention accomplishes this object by providing a surge prevention control and method that calculates a maximum permissible compressor discharge pressure from a predetermined algorithim that is representative of the compressor discharge pressure when the compressor is operating at its minimum permisible surge margin. The control also receives a signal from a sensor measuring the actual compressor discharge pressure. A error signal is formed by taking the difference between the measured pressure signal and the calculated signal. The control then continously adjusts the area of the diffuser so as to maintain the actual compressor discharge pressure at or below the calculated pressure. The calculated pressure is also corrected for variations in ambient temperature and altitude.

These and other objects, features and advantages of the present invention, are specifically set forth in, or will become apparent from, the following detailed description of a preferred embodiment of the invention when read in conjunction with the accompanying drawings.

BRIEF DESCRIPTION OF THE DRAWINGS

FIG. 3 is a compressor map of the auxiliary power unit of FIG. 1 showing compressor presure ratio as a function of compressor inlet flow.

DESCRIPTION OF THE PREFERRED EMBODIMENT

Figure 1:
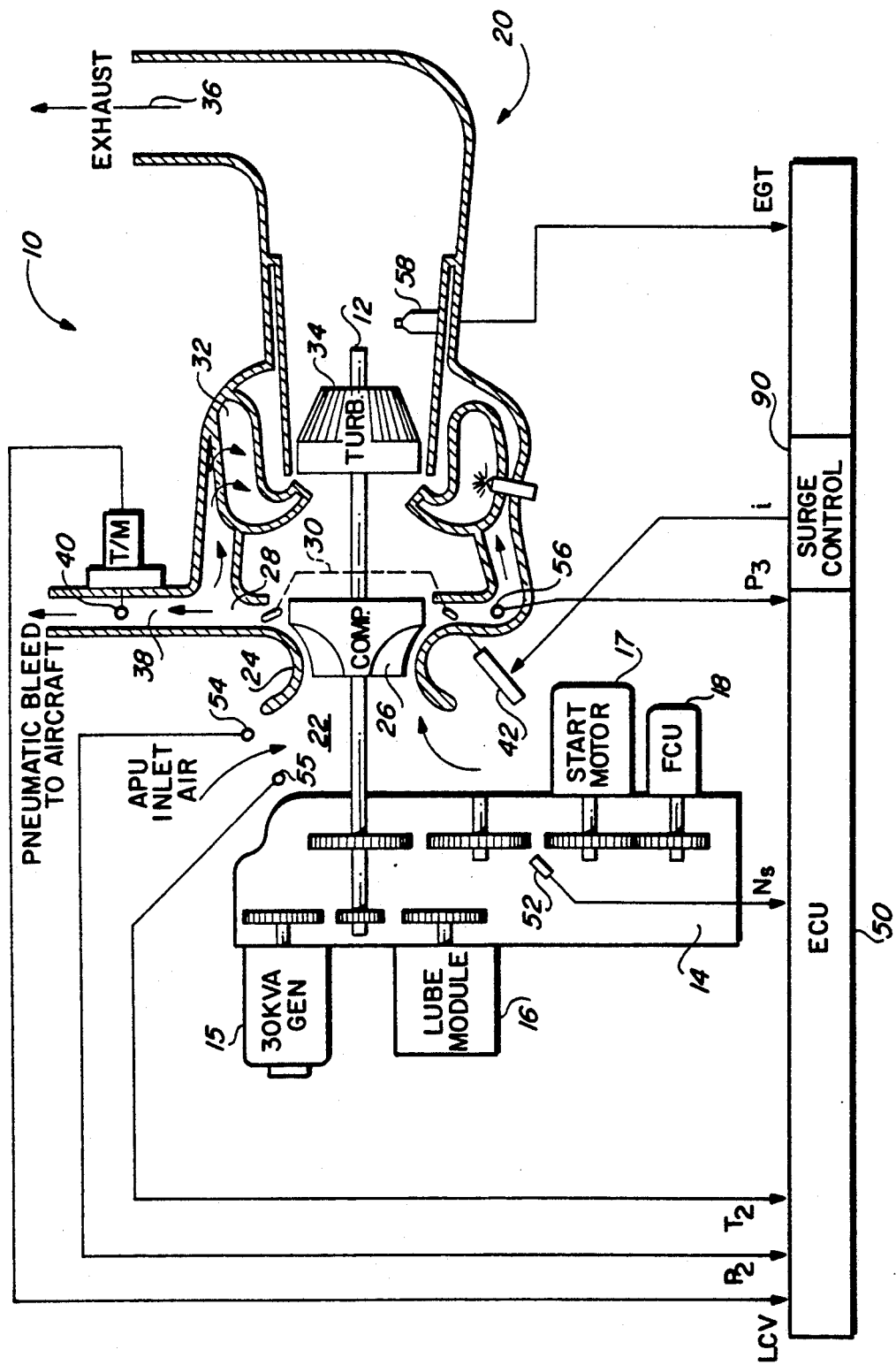
FIG. 1 is a schematic cross section of an exemplary auxiliary power unit having a variable geometry diffuser to which the surge prevention control of the present invention relates.

Referring to FIG. 1, an auxiliary power gas turbine engine to which the present invention relates is generally denoted by the reference numeral 10. For purposes of illustration, the engine 10 is depicted as an integral bleed engine even though the present invention is equally applicable to differently configured engines. The engine 10 includes an accessory gearbox 14 having mounted thereto an electric generator 15, a lube module 16, a start motor 17 and a fuel control unit 18.

The gas turbine engine 10 is comprised in flow series arrangement of an air inlet 22, a compressor 24, which includes an impeller 26 mounted for rotation on the shaft 12, and a variable geometry diffuser 28, a combustor 32, a turbine 34 operatively coupled to the impeller 26 via the shaft 12, and an exhaust gas outlet 36. The diffuser 28 has a plurality of circumferentially spaced, pivotable diffuser vanes 30. An integral bleed port 38 having a load control valve 40 for regulating the amount of bleed flow is disposed between the diffuser 28 and the combustor 32. Upon rotation of the shaft 12, air is inducted through the inlet 22 and pressurized in the compressor 24. The required bleed flow is bled off through the bleed port 38, with the remainder of the pressurized air entering the combustor 32 where it is mixed with fuel and ignited to form a hot, pressurized gas. This gas is then expanded across the turbine 34 to supply power to drive the impeller 26 and the accessory gearbox 14. An actuator 42, mounted to the engine 10, strokes the diffuser vanes 30 from a minimum open setting to a maximum open setting. The bleed air is delivered to valves, (not shown), on the aircraft which by way of example can be any one of the following, a main engine starter valve, an environmental control system pack flow control valve, or a wing anti-ice valve.

An electronic control unit (ECU), which may be analog or digital, governs the operation of the engine 10. The ECU 50 receives an engine speed signal Ns from a speed sensor 52 mounted in the gearbox 14, an inlet pressure signal P2 from a pressure sensor 54 mounted in the engine inlet 22, an inlet temperature signal T2 from a temperature sensor 55 mounted in the inlet 22, a compressor discharge pressure P3 from a pressure sensor 56 mounted downstream of the diffuser 28 and upstream of the bleed port 38, a diffuser vane angle signal VGD from a linear variable displacement transducer mounted on the actuator 42, an exhaust gas temperature EGT from a thermocouple 58 mounted downstream of the turbine 34. The ECU 50 also transmits a load control valve command signal, LCV, to open or close the load control valve 40.

Figure 2:
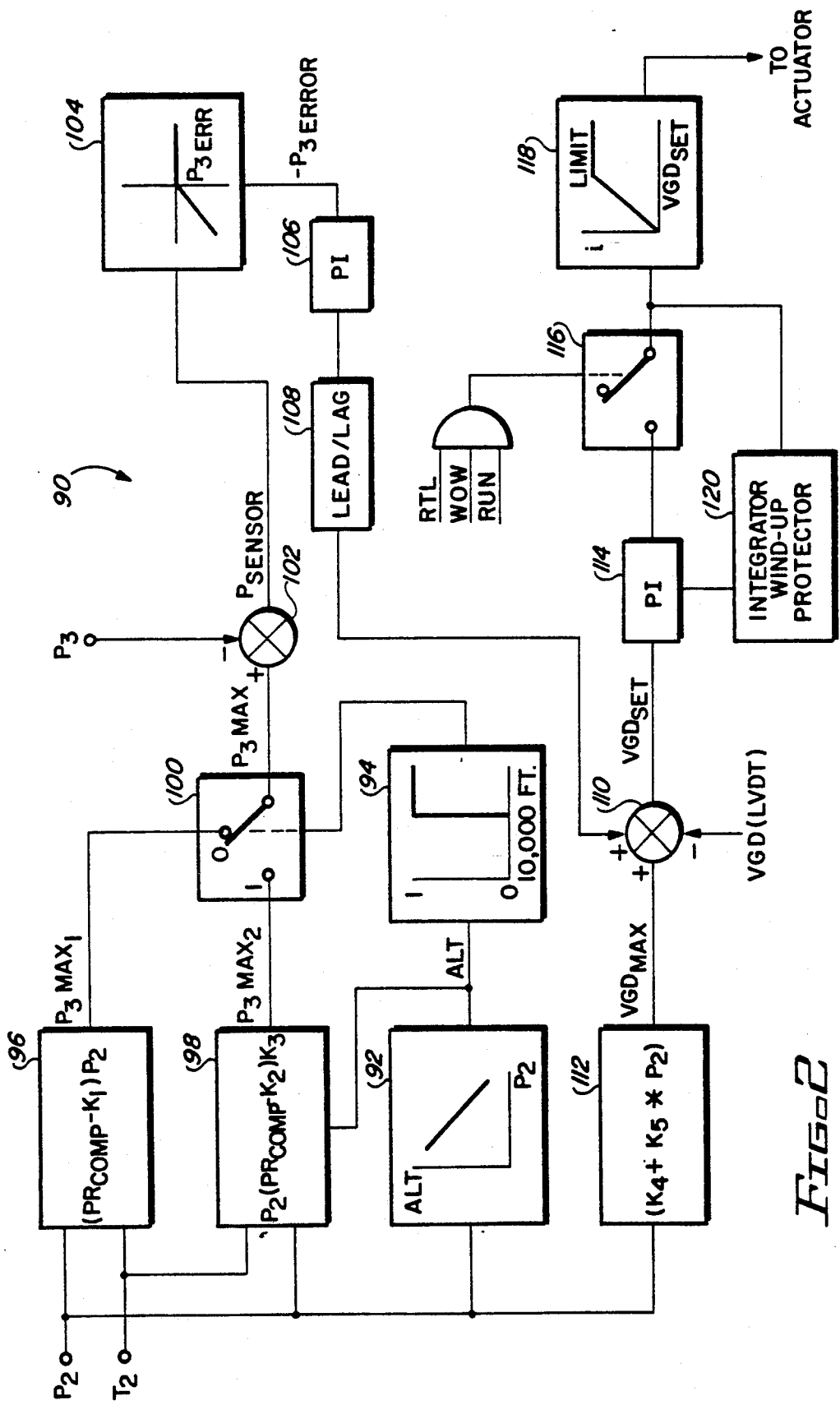
FIG. 2 is a block diagram of the surge prevention control for the auxiliary power unit of FIG. 1, that is responsive to sensors mounted in the engine.

In the preferred embodiment of the present invention, the stroking of the diffuser vanes 30 by the actuator 42 is driven by a control means 90 illustrated diagrammatically in FIG. 2. The control means 90 is preferably electronically integrated within the ECU 50 and has means for receiving the P2, T2, P3, and VGD signals.

Referring to FIG. 2, within the control means function generator 92 receives the P2 signal and solves the algorithm graphically depicted therein to generate an altitude equivalent signal ALT. Function generator 94 receives ALT and if this signal is less than a preselected value, preferably 10,000 ft, sends a low output signal to a switch 100, otherwise the function block 94 sends a high output signal to the switch 100.

The function generator 96 receives the P2 and T2 signals and solves the algorithm $$(PRcomp - k1) * P2$$

where PRcomp is a preselected, analytically determined pressure ratio (P3/P2) for the compressor 24 that corresponds to a surge margin of about six percent with the diffuser vanes in their maximum open setting at the engine's design point inlet conditions. PRcomp is represented by dashed line 164 in FIG. 3. K1 is a linearized, correction factor for variation in inlet temperature from the design condition and in the preferred embodiment is equal to 0.00733*T2 where T2 is in degrees fahrenheit. The output of the function generator 96 is a first maximum permissible P3 hereinafter denoted by P3max1 and is received by the switch 100 on its low side.

The function generator 98 receives the P2, T2, and ALT signals and solves the algorithm $$P2 * (PRcomp - K2) * K3$$

where PRcomp is as previously explained. K2 is a binomial temperature correction factor equal in the preferred embodiment to $0.0000533*T2^2 + 0.002*T2$, where T2 is in degrees fahrenheit. K3 is a linearized altitude correction factor equal, in the preferred embodiment, to $1.076 - 6.75*10^{-6} ALT$ where altitude is in feet. The output of the function generator 98 is a second maximum permissible P3 hereinafter also denoted by P3max2 and is received by the switch 100 on its high side. The switch 100 transmits the appropriate P3max signal depending on whether switch 100 is switched high or low in response to the signal from function generator 94.

Importantly, by keeping the measured P3 as measured by the sensor 56, below the P3max signal from switch 100, compressor surge can be avoided. To accomplish this result, the signal from the switch 100 is received by a summing junction 102 which also receives the P3 signal from the sensor 56 and calculates a difference where a negative value indicates that P3 is larger than P3max. This signal is received by a negative limiter 104 which only permits negative signals to pass through. The output of the limiter 104 is received by a conventional proportional plus integral controller 106 in series with a lead/lag compensator 108 where it is processed in a manner familiar to those skilled in the art. The output signal from the compensator 108 is received by a summing junction 110 as a negative input. The junction 110 also receives the VGD signal from the linear variable displacement transducer mounted on the actuator 42. The VGD signal is calibrated to give a zero signal when the vanes are in their minimum open setting and closes the loop on the vanes setting.

A function generator 112 receives the P2 signal and solves the algorithm $$K4 + (K5 * P2)$$

where K4 and K5 are correction factors for changes in ambient pressure to the compressor's surge margin. In the preferred embodiment K4 and K5 are equal to 3.022 and 0.3386 respectively. The output of the function block 112 is a maximum open command VGDmax signal for the diffuser vanes 30 where the vanes 30, in the preferred embodiment, are configured to rotate from a minimum position of 0 degrees to a maximum position of 8 degrees at a given altitude. The summing junction 110 sums these three values and generates an output signal VGDset. The control 90 will continuously adjust the VGDset signal until the P3error signal goes to zero.

As would appreciated by a person skilled in the art, the correction factors described herein are exemplary. The actual magnitude and form of the factors will of course vary depending on the specific engine design.

The VGDset signal is further processed in a conventional proportional plus integral controller (PI) 114. The output from the PI 114 passes through a switch 116. The switch 116 is provided to permit the control means 90 to be shut off during certain operations. For example, in the application for which the preferred embodiment was designed, the variable diffuser vanes are only permitted to open when the engine 10 is at operating speed and the aircraft is on the ground. The switch 116 receives aircraft signals through the ECU 50 and closes only when those conditions are satisfied. It should be appreciated, that the switch 116 is optional and can be removed from the control means 90, should for example inflight operation of the variable vane diffusers be required. If the switch 116 is closed the VGDset signal passes to a function generator 118 which generates a current for the actuator 42, which in this embodiment is preferably controlled by a torque motor (not shown).

A integrator windup protector 120 closes the loop between the generator 118 and the PI 114. In a manner familiar to those skilled in the art, the protector 120 holds the magnitude of the signal from the PI 114 constant so long as the generator 118 is not generating a maximum control signal.

To illustrate what is happening to the engine 10 as the diffuser vanes 30 pivot in response to command from the control 90, FIG. 3 shows the operating characteristics of the compressor 24 having the variable geometry diffuser 28 in the form of a conventional compressor map which plots compressor pressure ratio as a function of compressor inlet air flow for lines of constant corrected rotational speed referred to as operating lines. An operating line 150 depicts the performance of the compressor 24 with the diffuser vanes 30 in their maximum open setting, while an operating line 152 depicts the performance of the compressor 24 when the diffuser vanes 30 are in their minimum open setting. Both operating lines 150 and 152 terminate at a surge line 156.

Starting with the engine 10 operating in the first mode of operation, (maximum bleed flow, high EGT, and diffuser vanes in their maximum open setting), illustrated by the circle on operating line 150, as the bleed flow required by the aircraft decreases, P3 starts to rise. Simultaneously, the control means 90 calculates the appropriate P3max. When P3 exceeds P3max, a P3error signal is formed and transmitted to the summing junction 110. When the compressor 24 reaches the intersection of the operating line 150 and dashed line 164, the control means 90 commands the actuator 40 to close the diffuser to hold P3 constant, and the compressor 24 operates continuously along line 164 until the vanes reach their minimum open setting on the operating line 152 and the P3error signal goes to zero. The engine 10 is now operating in its second mode, (maximum shaft horsepower, minimum or zero bleed flow).

Because the function block 112 always tries to move the vanes to their maximum open setting, as soon as P3 begins to drop which indicates increasing bleed demand, the vanes 30 will be commanded open at a rate that maintains P3error as a positive value. The transition back to operating line 150 is represented by dashed line 166 in FIG. 3.

Thus, a control means 90 and method is provided for continuously positioning the vanes of a variable geometry diffuser to assure surge free operation. Importantly, by using sensors mounted on the engine combined with predetermined algorithims, the control means 90 can operate without requiring any signal from the aircraft.

Various modifications and alterations to the above described preferred embodiment will be apparent to those skilled in the art. Accordingly, this description of of the invention should be considered exemplary in nature and not as limiting to the scope and spirit of the invention as set forth in the following claims.

What is claimed is:

1. A method for preventing surge of a gas turbine engine compressor having a variable geometry diffuser that is positionable between a maximum open setting and minimum open setting, comprising the steps of:
   receiving a plurality of signals representative of said engine's inlet temperature, inlet pressure, compressor discharge pressure and said diffuser position respectively;
   preselecting a compressor pressure ratio representative of minimum permissible surge margin with the diffuser in said maximum open setting;
   calculating a first maximum compressor discharge pressure from said inlet temperature and pressure signals and said preselected pressure ratio and generating a signal thereof;
   combining said calculated discharge pressure signal with said discharge pressure signal to form an error signal;
   preselecting a maximum open setting for said diffuser and adjusting said maximum setting for variations in inlet pressure, and generating a command signal thereof;
   combining said command signal with said error signal and said diffuser position signal to form a second command signal;
   receiving said second command signal and generating a control signal for said diffuser; and
   repeating said previous steps until said error signal is substantially zero.

2. The method of claim 1 further including the steps of receiving said error signal and generating a second error signal only if said discharge pressure is greater than said calculated discharge pressure, said step of generating a second error signal including the step of processing said second error signal through a proportional plus integral controller in series with a lead/lag compensator.

3. The method of claim 2 further including the step of processing said second command signal through a proportional plus integral controller.

4. The method of claim 1 further comprising the steps of;
   receiving said inlet pressure signal and calculating therefrom a signal representative of altitude;
   calculating a second maximum compressor discharge pressure from said inlet temperature and pressure signals, said calculated altitude and said preselected pressure ratio and generating a signal thereof;
   comparing said calculated altitude to a preselected altitude; and
   selecting said first maximum compressor discharge pressure when said calculated altitude is less than said preselected altitude, and selecting said second maximum compressor discharge pressure when said calculated altitude is greater than or equal to said preselected altitude.

5. The method of claim 4 further including the step of correcting said first and second maximum compressor discharge pressures for variations in inlet temperature.

6. The method of claim 5 further including the step of correcting said second maximum compressor discharge pressure for variations in altitude.

7. A surge prevention control for a gas turbine engine with a compressor having a variable geometry diffuser that is positionable between a maximum open setting and minimum open setting, comprising:

means for receiving a plurality of signals representative of said engine's inlet temperature, inlet pressure, compressor discharge pressure and said diffuser position respectively;

a first function generator having a preselected compressor pressure ratio stored therein and receiving said inlet temperature and pressure signals, and generating an output signal representative of a maximum compressor discharge pressure;

a first summing junction for combining said output signal with said compressor discharge signal to form an error signal;

a limiter receiving said error signal and transmitting it only when said compressor discharge signal is greater than said output signal;

a second function generator having a preselected maximum open setting for said diffuser stored therein and receiving said inlet pressure signal, and generating a first command signal thereof; and a second summing junction for combining said first command signal, said error signal, and said diffuser position signal to form and transmit a second command signal to said diffuser.

8. The surge prevention control of claim 7 further comprising:

a proportional plus integral controller for receiving said second command signal and generating an output signal therefrom;

a third function generator for receiving said output signal from said controller, and generating a control signal for an actuator controlling said diffuser setting; and an integrator windup protector operably disposed between said controller and said third function generator;

9. The surge prevention control of claim 8 further including a switch in parallel with said protector, said switch opening and closing in response to signals external of said surge prevention control.

10. The surge prevention control of claim 7 further comprising a proportional plus integral controller in series with a lead/lag compensator disposed between said limiter and said second summing junction.

11. The surge prevention control of claim 7 further comprising:

a fourth function generator for receiving said inlet pressure signal and generating a signal representative of altitude;

a fifth function generator having said preselected compressor pressure ratio stored therein and receiving said inlet temperature, pressure, and altitude signals, and generating a second output signal representative of a maximum compressor discharge pressure;

a comparator for comparing said altitude signal to a preselected value and generating a signal thereof; and a switch positionable to said first and fifth function generators in response to said signal from said comparator.

12. A gas turbine engine comprising:

a compressor including an impeller mounted for rotation on a shaft for inducting ambient air, and a variable geometry diffuser downstream of said compressor for diffusing the air exiting said impeller;

a control valve mounted in a bleed port downstream of said diffuser for regulating the amount of bleed flow;

a combustor receiving pressurized air and fuel, and for igniting said mixture to generate hot gases;

a turbine mounted for rotation to said shaft and driven by said hot gases from said combustor;

a gearbox coupled to said shaft and having at least one accessory mounted thereto;

a plurality of sensors mounted at preselected locations in said engine;

a control unit for governing the operation of said engine in response to said sensors, said control unit including a modulating surge prevention control that opens and closes said diffuser to maintain a discharge pressure of said compressor at or below a preselected pressure representative of a minimum permissible surge margin of said compressor;

said surge prevention control comprising:

means for receiving a plurality of signals representative of said engine's inlet temperature, inlet pressure, compressor discharge pressure and said diffuser position respectively;

a first function generator having a preselected compressor pressure ratio stored therein and receiving said inlet temperature and pressure signals, and generating an output signal representative of a maximum compressor discharge pressure;

a first summing junction for combining said output signal with said compressor discharge signal to form an error signal;

a limiter receiving said error signal and transmitting it only when said compressor discharge signal is greater than said output signal;

a second function generator having a preselected maximum open setting for said diffuser stored therein and receiving said inlet pressure signal, and generating a first command signal thereof; and a second summing junction for combining said first command signal, said error signal, and said diffuser position signal to form and transmit a second command signal to said diffuser.

13. The gas turbine engine of claim 12 wherein said variable geometry diffuser includes a plurality of circumferentially spaced, pivotable diffuser vanes positionable between a maximum open setting and a minimum open setting.

14. The surge prevention control of claim 12 further comprising:

a proportional plus integral controller for receiving said second command signal and generating an output signal therefrom;

a third function generator for receiving said output signal from said controller, and generating a control signal for an actuator controlling said diffuser; and an integrator windup protector operably disposed between said controller and said third function generator.

15. The surge prevention control of claim 14 further including a switch in parallel with said protector, said switch opening and closing in response to signals external of said surge prevention control.

16. The surge prevention control of claim 12 further comprising a proportional plus integral controller in series with a lead/lag compensator disposed between said limiter and said second summing junction.

17. The surge prevention control of claim 12 further comprising:

a fourth function generator for receiving said inlet pressure signal and generating a signal representative of altitude;

a fifth function generator having said preselected compressor pressure ratio stored therein and receiving said inlet temperature, pressure, and altitude signals, and generating a second output signal representative of a maximum compressor discharge pressure;

a comparator for comparing said altitude signal to a preselected value and generating a signal thereof; and a switch positionable to said first and fifth function generators in response to said signal from said comparator.

* * * * *

UNITED STATES PATENT AND TRADEMARK OFFICE
CERTIFICATE OF CORRECTION

PATENT NO.  : 5,222,356
DATED       : June 29, 1993
INVENTOR(S) : Kenneth W. Evenson, Daniel J. Kuhn, Thomas Nesdill, Robert B. Sumegi It is certified that error appears in the above-identified patent and that said Letters Patent is hereby corrected as shown below:

Col. 7, line 49:  delete ";" and substitute --.--.
Col. 8, line 31:  delete ":",
       line 60:  delete "surge prevention control" and substitute --gas turbine engine--, and after "12" insert --wherein said surge prevention control--.
Col. 9, line 5:   delete "surge prevention control" and substitute --gas turbine engine--, and after "14" insert --wherein said surge prevention control--.
       line 10:  delete "surge prevention control" and substitute --gas turbine engine--, and after "12" insert --wherein said surge prevention control--.
       line 15:  delete "surge prevention control" and substitute --gas turbine engine--, and after "12" insert --wherein said surge prevention control--.

Signed and Sealed this

First Day of March, 1994

Attest:

BRUCE LEHMAN

*Attesting Officer*   *Commissioner of Patents and Trademarks*